(12) United States Patent
Challa

(10) Patent No.: US 12,480,009 B2
(45) Date of Patent: *Nov. 25, 2025

(54) NANOPOROUS CERIUM OXIDE NANOPARTICLE MACRO-STRUCTURE

(71) Applicant: Xheme Inc., Newton, MA (US)

(72) Inventor: Siva Sai Ramana Kumar Challa, Newton, MA (US)

(73) Assignee: XHEME INC., Newton, MA (US)

( * ) Notice: Subject to any disclaimer, the term of this patent is extended or adjusted under 35 U.S.C. 154(b) by 1028 days.

This patent is subject to a terminal disclaimer.

(21) Appl. No.: 17/390,199

(22) Filed: Jul. 30, 2021

(65) Prior Publication Data

US 2023/0035874 A1 Feb. 2, 2023

(51) Int. Cl.
| | | |
|---|---|---|
| *C09D 11/037* | (2014.01) | |
| *C01F 17/235* | (2020.01) | |
| *D06C 29/00* | (2006.01) | |
| *D06P 1/00* | (2006.01) | |
| *D06P 1/34* | (2006.01) | |
| *D06P 1/52* | (2006.01) | |
| *D06P 1/673* | (2006.01) | |

(52) U.S. Cl.
CPC .......... *C09D 11/037* (2013.01); *C01F 17/235* (2020.01); *D06C 29/00* (2013.01); *D06P 1/0036* (2013.01); *D06P 1/34* (2013.01); *D06P 1/5214* (2013.01); *D06P 1/673* (2013.01); *C01P 2004/50* (2013.01); *C01P 2004/61* (2013.01); *C01P 2004/62* (2013.01); *C01P 2004/64* (2013.01); *C01P 2006/16* (2013.01)

(58) Field of Classification Search
CPC .................................................... C01F 17/235
See application file for complete search history.

(56) References Cited

U.S. PATENT DOCUMENTS

| | | |
|---|---|---|
| 5,167,657 A | 12/1992 | Patel |
| 5,496,359 A | 3/1996 | Davidson |
| 5,607,992 A | 3/1997 | Chiba et al. |
| 5,938,837 A | 8/1999 | Hanawa et al. |
| 6,752,979 B1 | 6/2004 | Talbot et al. |
| 6,932,959 B2 | 8/2005 | Sterte et al. |
| 7,534,453 B1 | 5/2009 | Rzigalinski et al. |
| 7,955,431 B2 | 6/2011 | Bousseau et al. |
| 8,317,888 B2 | 11/2012 | Criniere |
| 8,410,206 B2 | 4/2013 | Berkei et al. |

(Continued)

FOREIGN PATENT DOCUMENTS

| | | |
|---|---|---|
| BR | 102016006496 | 9/2017 |
| BR | 102016006496 A2 | 9/2017 |

(Continued)

OTHER PUBLICATIONS

International Search Report and Written Opinion from related PCT Appln. No. PCT/US2023/022644, dated Oct. 11, 2023.

(Continued)

*Primary Examiner* — Peter F Godenschwager
(74) *Attorney, Agent, or Firm* — Grossman, Tucker, Perreault & Pfleger, PLLC

(57) ABSTRACT

The present invention is directed to a nanoporous cerium oxide nanoparticle (NCeONP) macro-structure containing a plurality of the cerium oxide nanoparticles which define a plurality of macro-structure pores. The NCeONP macro structure may be used to improve pigment and/or dye performance.

11 Claims, 7 Drawing Sheets

(56) References Cited

U.S. PATENT DOCUMENTS

| | | | |
|---|---|---|---|
| 8,747,907 | B2 | 6/2014 | Rzigalinski et al. |
| 9,649,337 | B2 | 5/2017 | Rzigalinski et al. |
| 9,732,427 | B2 | 8/2017 | Poxson et al. |
| 9,909,033 | B2 | 3/2018 | Criniere et al. |
| 10,385,219 | B2 | 8/2019 | Siebert et al. |
| 11,518,838 | B2 | 12/2022 | Kono et al. |
| 2004/0009542 | A1 | 1/2004 | Dumont et al. |
| 2011/0315567 | A1 | 12/2011 | Boynton et al. |
| 2012/0031827 | A1 | 2/2012 | Burba et al. |
| 2013/0078547 | A1 | 3/2013 | Park et al. |
| 2014/0179870 | A1 | 6/2014 | Kondo |
| 2015/0093543 | A1 | 4/2015 | Kushida et al. |
| 2015/0140317 | A1 | 5/2015 | Biberger et al. |
| 2017/0121511 | A1 | 5/2017 | Li et al. |
| 2018/0282548 | A1 | 10/2018 | Buissette et al. |
| 2020/0024452 | A1 | 1/2020 | Todoroki et al. |
| 2020/0385591 | A1 | 12/2020 | Steveninck |
| 2021/0235690 | A1 | 8/2021 | Rzigalinski et al. |
| 2023/0035887 | A1 | 2/2023 | Challa |

FOREIGN PATENT DOCUMENTS

| | | |
|---|---|---|
| CA | 2310461 | 6/1999 |
| CA | 2310461 A1 | 6/1999 |
| CN | 101948247 | 1/2011 |
| CN | 101948247 A | 1/2011 |
| CN | 102787491 | 4/2014 |
| CN | 102787491 B | 4/2014 |
| CN | 103849174 | 6/2014 |
| CN | 103849174 A | 6/2014 |
| CN | 106634124 | 5/2017 |
| CN | 106634124 A | 5/2017 |
| CN | 111961251 | 11/2020 |
| CN | 111961251 A | 11/2020 |
| CN | 112094493 | 12/2020 |
| CN | 112520215 | 3/2021 |
| CN | 112520215 A | 3/2021 |
| DE | 19751448 | 5/1999 |
| DE | 19751448 A | 5/1999 |
| EP | 1362892 | 11/2003 |
| EP | 1362892 A1 | 11/2003 |
| EP | 1974808 | 10/2008 |
| EP | 1974808 A1 | 10/2008 |
| EP | 3795644 | 3/2021 |
| EP | 3795644 A1 | 3/2021 |
| JP | H10182395 | 7/1998 |
| JP | H10182395 A | 7/1998 |
| JP | 3048000 | 6/2000 |
| JP | 3048000 B2 | 6/2000 |
| JP | 2010-89280 | 4/2010 |
| JP | 2010089280 A | 4/2010 |
| JP | 6610168 | 11/2019 |
| JP | 6610168 B2 | 11/2019 |
| WO | 91/11349 | 8/1991 |
| WO | 9111349 A2 | 8/1991 |
| WO | 01/36332 | 5/2001 |
| WO | 02/42201 | 5/2002 |
| WO | 2007/002662 | 1/2007 |
| WO | 2015/197656 | 12/2015 |
| WO | 2016/014037 | 1/2016 |
| WO | 2016014037 A1 | 1/2016 |
| WO | 2017/062573 | 4/2017 |
| WO | 2017062573 A1 | 4/2017 |
| WO | 2019/082903 | 5/2019 |
| WO | 2020/023932 | 1/2020 |
| WO | 2020023932 A1 | 1/2020 |
| WO | 2021/089110 | 5/2021 |

OTHER PUBLICATIONS

International Search Report and Written Opinion from related PCT Appln. No. PCT/US2023/071680, dated Dec. 11, 2023.
Amorati et al., "Tandem Hydroperoxyl-Alkylperoxyl Radical Quenching by an Engineered Nanoporous Cerium Oxide Nanoparticle Macrostructure (NCeONP): Toward Efficient Solid-State Autooxidation Inhibitors", ACS Omega, vol. 8, pp. 40174-40183. Oct. 18, 2023.
International Search Report and Written Opinion from corresponding PCT Appln. No. PCT/US2022/074303, dated Oct. 12, 2022.
International Search Report and Written Opinion from related PCT Appln. No. PCT/US2019/043785, dated Dec. 3, 2019.
Extended European Search Report from related Application No. 19842184.4, dated Aug. 18, 2022.
Charbgoo, et al., "Cerium Oxide Nanoparticles: Green Synthesis and Biological Applications", International Journal of Nanomedicine, Dove Press, Feb. 20, 2017, 12, pp. 1401-1413.
Singh, et al., "Treatment of Neurodegenerative Disorders with Radical Nanomedicine", Annals of the New York Academy of Sciences, 1122, pp. 219-230, Jan. 2008.
Zhang et al., "Reinforcement of natural rubber latex with silica modified by cerium oxide: preparation and properties", Journal of Rare Earths, vol. 34, No. 2, 2016, China, pp. 221-226.
Singh et al., "Treatment of Neurodegenerative Disorders with Radical Nanomedicine", Annals of the New York Academy of Sciences, vol. 1122, 2007, New York, pp. 219-230.
Antosik et al., "Vitamin E Analogue Protects Red Blood Cells again Storage-Induced Oxidative Damage", Transfusion Medicine and Hemotherapy, vol. 45, No. 5, 2018, pp. 347-354.
Rzigalinski et al., "Cerium Oxide Nanoparticles Improve Lifespan of Stored Blood", Military Medicine, vol. 185, Jan./Feb. Supplement 2020, U.S., pp. 103-109.
International Search Report and Written Opinion from related PCT Appln. No. PCT/US2022/077776, dated Jan. 5, 2023.
International Search Report and Written Opinion from corresponding PCT Appln. No. PCT/US2022/074303, dated Oct. 12, 2022. 12 pages.
Written Opinion of the International Search Report from corresponding PCT Appln. No. PCT/US19/43785, dated Dec. 3, 2019. 9 pages.
International Preliminary Report on Patentability from corresponding PCT Appln. No. PCT/US2019/043785, dated Dec. 3, 2019. 10 pages.
Extended European Search Report from related Application No. 19842184.4, dated Aug. 18, 2022. 9 pages.
International Search Report and Written Opinion from related PCT Appln. No. PCT/US2022/081272, dated Apr. 4, 2023.
Partial Search Report/Invitation to Pay Additional fees from related PCT Appln. No. PCT/US2023/022644, dated Jul. 26, 2023.
Hassan et al., "Monolithic Cerium Oxide Nanoparticles Assembly for Wearable Electronics", IOP Science, 2021 The Electrochemical Society cited in Invitation to Pay Additional fees from related PCT Appln. No. PCT/US2023/022644.
Maeder et al., "Flame-made ceria nanoparticles", Journal of Materials Research, vol. 17, No. 6, 2002, Pennsylvania, U.S., pp. 1356-1362.
Extended European Search Report from related EPO Appln. No. 22850541.8, dated Jun. 10, 2025.
Asadpour et al., "Effect of Zirconium Dioxide Nanoparticles on Glutathione Peroxidase Enzymen in PC12 and N2a Cell Lines", Iranian Journal of Pharmaceutical Research, vol. 13, No. 4, 2014, Iran, pp. 1141-1148.
Kozelskaya et al., "Morphological changes of the red blood cells treated with metal oxide nanoparticles", Toxicology in Vitro, vol. 37, 2016, Russia, pp. 34-40.
Extended European Search Report from related EPO Appln. No. 22879525.8, dated Aug. 20, 2025.

NANOPOROUS CERIUM OXIDE NANOPARTICLE MACRO-STRUCTURE

FIELD

The present invention is directed to a nanoporous cerium oxide nanoparticle (NCeONP) macro-structure containing a plurality of the cerium oxide nanoparticles which define a plurality of macro-structure pores. The NCeONP macro structure may be used to improve pigment and/or dye performance.

BACKGROUND

Cerium based oxide compounds have been reported. For example, cerium oxide is an oxide of the rare-earth metal cerium. Cerium oxide nanoparticles have received attention in the scientific literature due to, e.g., their catalytic activity and antioxidant properties. Research to identify and improve upon the performance of cerium oxide nanoparticles therefore remains an on-going research and development focus, to identify additional enhancements to their structure, properties and applications.

SUMMARY

Nanoporous cerium oxide nanoparticle macro-structure comprising a plurality of cerium oxide nanoparticles having a diameter in the range of 10 nm to 100 nm present as a macro-structure having macro-structure diameter in the range of 50 nm to 30,000 nm and macro-structure pore diameter in the range of 10 nm to 1100 nm.

Nanoporous cerium oxide nanoparticle macro-structure comprising a plurality of cerium oxide nanoparticles having a diameter in the range of 10 nm to 100 nm present as a macro-structure having: (1) a macro-structure diameter in the range of 10 nm to 300 nm and a macro-structure pore diameter in the range of 5 nm to 30 nm; and (2) a macro-structure diameter in the range of 5,000 nm to 30,000 nm and a macro-structure pore diameter in the range of 900 nm to 1100 nm.

A finishing agent formulation for a colored substrate comprising: a plurality of cerium oxide nanoparticles having a diameter in the range of 10 nm to 100 nm present as a macro-structure wherein said macro-structure has macro-structure diameter in the range of 50 nm to 30,000 nm and macro-structure pore diameter in the range of 10 nm to 1100 nm; and polymeric binder.

A formulation comprising: a plurality of cerium oxide nanoparticles having a diameter in the range of 10 nm to 100 nm present as a macro-structure in combination with a pigment or dye, wherein said macro-structure has macro-structure diameters in the range of 50 nm to 30,000 nm and macro-structure pore diameters in the range of 10 nm to 1100 nm.

A method for improving the color stability of a pigment or dye on or within a given substrate, comprising: supplying nanoporous cerium oxide nanoparticle macro-structure (NCeONP) comprising a plurality of cerium oxide nanoparticles having a diameter in the range of 10 nm to 100 nm present as a macro-structure having macro-structure diameter in the range of 50 nm to 30,000 nm and macro-structure pore diameter in the range of 10 nm to 1100 nm; and applying said nanoporous cerium oxide macro-structure to a surface of said substrate.

BRIEF DESCRIPTION OF THE DRAWINGS

Aspects of the present disclosure may be appreciated upon review of the description herein and the accompanying drawings which identify as follows.

DETAILED DESCRIPTION

Figure 1:
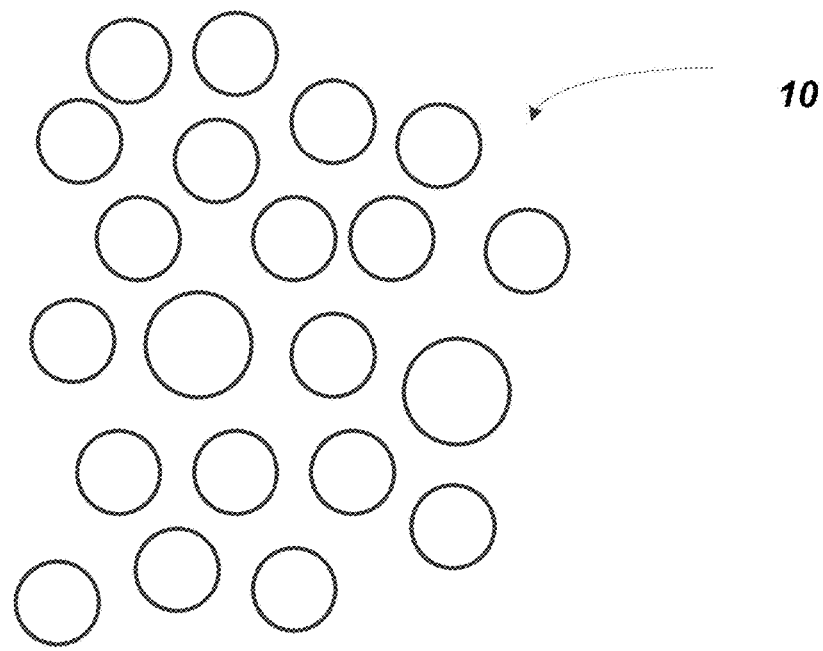
FIG. 1 illustrates cerium oxide nanoparticles.

The present invention stands directed at nanoporous cerium oxide nanoparticle (NCeONP) macro-structure. Reference to a macro-structure is reference to the feature that a plurality of the particles associate or adhere to one another where the macro-structure has its own pore size diameter. With attention to FIG. 1, preferably, the starting cerium oxide nanoparticles 10 preferably have a diameter (largest linear dimension) in the range of 10 nm to 100 nm. More preferably, the cerium oxide nanoparticles employed herein have a diameter in the range of 10 nm to 50 nm or 10 nm to 30 nm or 20 nm to 30 nm.

Figure 2:
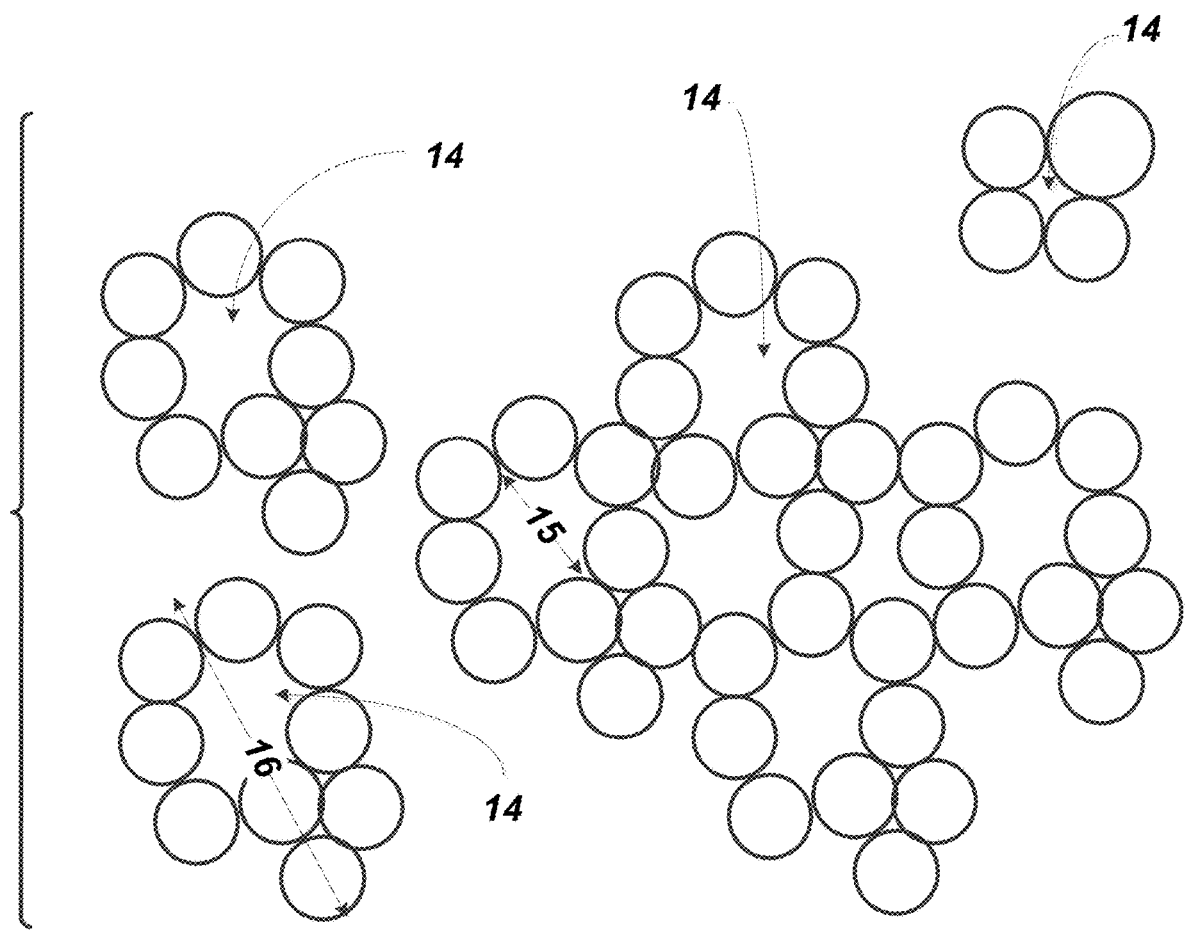
FIG. 2 illustrates the nanoporous cerium oxide nanoparticle (NCeONP) macro-structure formed from the cerium oxide nanoparticles illustrated in FIG. 1.

The above referenced cerium oxide nanoparticles are then preferably degassed with nitrogen for a preferred period of 30 minutes to 60 minutes. This is then preferably followed by heating at elevated temperature, and preferably at the temperature range of 50° C. to 900° C. for a preferred period of 1.0 hour to 3.0 hours, more preferably 1.0 hour to 2.0 hours. Accordingly, such heating of the cerium oxide nanoparticles was observed to form a plurality of nanoporous cerium oxide nanoparticle macro-structures 12 illustrated in FIG. 2 having macro-structure pores 14.

The macro-structure pores 14 that are formed by the cerium oxide nanoparticle macrostructure 12 preferably have a diameter (largest linear dimension) as indicated by arrow 15 in the range of 10 nm to 1100 nm, more preferably, 10 nm to 750 nm or 10 nm to 500 nm or 10 nm to 250 nm or 10 nm to 100 nm or 10 nm to 50 nm or 10 nm to 25 nm. In addition, the nanoporous cerium oxide nanoparticle macro-structures 12 themselves are contemplated to have a preferred diameter (largest linear dimension) as indicated by arrow 16 in the range of 50 nm to 30,000 nm.

In one particular preferred embodiment, the nanoporous cerium oxide nanoparticle macro-structures (NCeONP) that are formed herein have a binary size distribution with respect to both their macro-structure diameter 16 and macro-structure pore diameter 15. A binary size distribution is reference to two distributions of size ranges for both the macro-structure diameter and macro-structure pore diameter. That is, the preparation methods herein preferably provide a nanoporous cerium oxide nanoparticle macro-structure that has the following binary size distribution: (1) macro-structure diameter in the range of 10 nm to 300 nm with a macro-structure pore diameter in the range of 5 nm to 30 nm, more preferably 10 nm to 20 nm; and (2) macro-structure diameter in the range of 5,000 nm to 30,000 nm with a macro-structure pore diameter in the range of 900 nm to 1100 nm.

Figure 3:
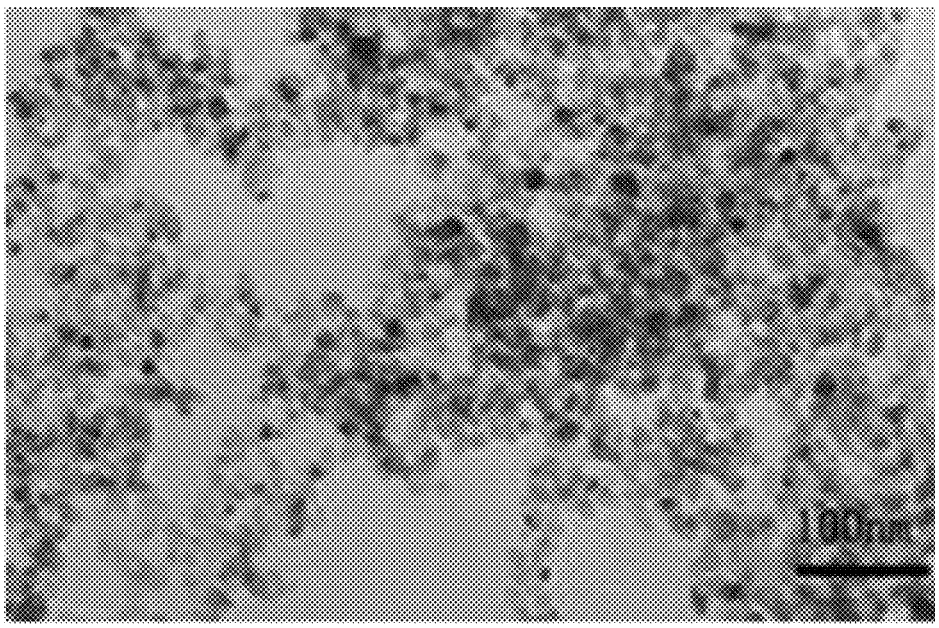
FIG. 3 is a scanning electron micrograph of the cerium oxide nanoparticles employed to form the nanoporous cerium oxide nanoparticle macro-structure.
Figure 4A:
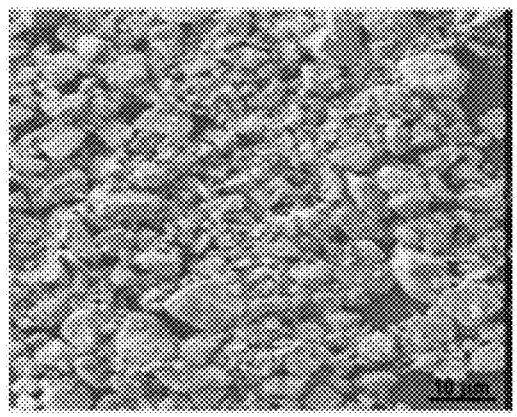
FIG. 4A is a scanning electron micrograph of the nanoporous cerium oxide nanoparticle micro-structure at the indicated magnification.
Figure 4B:
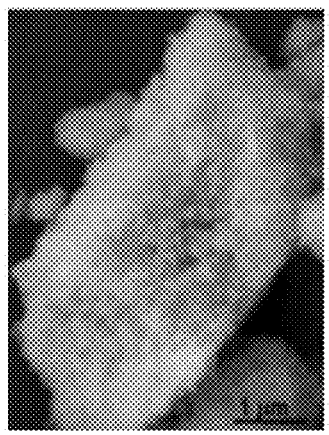
FIG. 4B is another scanning electron micrograph of the nanoporous cerium oxide nanoparticle micro-structure at the indicated magnification.
Figure 4C:
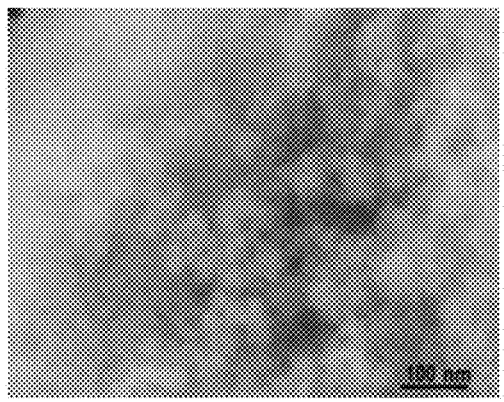
FIG. 4C is another scanning electron micrograph of the nanoporous cerium oxide nanoparticle micro-structure at the indicated magnification.

FIG. 3 is a scanning electron micrograph of the cerium oxide nanoparticles employed herein to form the nanoporous cerium oxide nanoparticle macro-structure. As noted above, such starting cerium oxide nanoparticles preferably had a diameter of 20 nm to 30 nm. FIGS. 4A, 4B and 4C, respectively, provide scanning electron micrographs at increasing magnification showing the nanoporous cerium oxide nanoparticle macro-structure herein formed from the cerium oxide nanoparticles of FIG. 3, wherein the macro-structure itself forms macro-structure pores 14 (see again FIG. 1).

The nanoporous cerium oxide nanoparticle macro-structure (NCeONP) herein augments and increases the performance of pigments and/or dyes with regards to, among other things, the ability to retain color intensity and resistance to fading of the color on exposure to ultraviolet (UV) radiation. A pigment herein is understood as colored particles that do not generally dissolve in a host medium and when placed in a liquid host medium exist as a suspension, while dyes may be understood as colored particles and/or colored liquids that will dissolve in a given medium. Dyes are typically organic molecules either naturally occurring or man-made. Pigments and dyes may therefore be both of organic and inorganic composition. An inorganic pigment or dye may be understood as not being based on carbon chemistry, examples of which includes aluminum-based pigments, copper-based pigments, cobalt based pigments, manganese-based pigments, iron based pigments, chromium based pigments, cadmium based pigments, etc. Pigments or dyes herein that may also be improved in performance with respect to UV exposure also include natural pigments or dyes (found in nature). Such natural pigments include for example carotenoids pigments or indigo dyes, which is reference to pigments in plants, algae, and photosynthetic bacteria, that typically include yellow, orange and red fat-soluble type pigments. Preferably, in a given formulation containing pigment or dye as noted above, the nanoporous cerium oxide nanoparticle macro-structure herein is present at a level of 0.1% by weight to 5.0% by weight.

Without being bound by any particular theory, the nanoporous cerium oxide nanoparticle macrostructure (NCeONP) with its associated macro-structure pores is contemplated to interact with the pigment or dye and attenuate the effects of UV radiation on pigment performance. In some situations, it is contemplated that the dye molecule or pigment particle itself may enter into the pores of the nanoporous cerium oxide nanoparticle macro-structure and be further protected from UV radiation exposure. The nanoporous cerium oxide nanoparticle macro-structure as an inorganic host may therefore accommodate and contain an organic pigment, inorganic pigment, organic dye, inorganic dye, and/or natural pigments/dyes, within all or a portion of the macro-structure pores. In such a situation, it is contemplated that the incident UV radiation will undergo scattering before impinging upon the contained pigment and/or dye and/or the cerium oxide itself can serve to dissipate the UV radiation energy that would otherwise compromise pigment and/or dye performance.

The nanoporous cerium oxide nanoparticle macro-structure herein may be used to improve pigment and/or dye performance by different preferred procedures. In one technique, the nanoporous cerium oxide nanoparticle macro-structure herein may be applied as a finishing agent on a colored substrate, e.g., a dyed fabric. In another technique, the nanoporous cerium oxide nanoparticle macro-structure herein may be mixed with pigment and/or dye prior to application on a given substrate, such as a mixture of the cerium oxide nanoparticle macro-structure with a pigment and/or dye and other ingredients (e.g., polymeric binder and water) and then employed as a printing paste or ink in various printing applications. A printing ink herein may be understood as a liquid medium wherein the nanoporous cerium oxide nanoparticle macro-structure may be suspended along with suspended pigment particles or dissolved dye. Such printing inks may include other components, such as surfactants to assist in dispersion of the ingredients, along with additives to improve the printing operation.

The formulation containing nanoporous cerium oxide nanoparticle macro-structure (NCeONP) in combination with pigment and/or dye may also be utilized as a dying formulation for incorporating color to a textile fabric. That is, the formulation may be used to apply a selected color directly to a given textile fabric where the color is sourced from either a pigment or dye, as described herein.

When the nanoporous cerium oxide nanoparticle macro-structure (NCeONP) herein is employed as a finishing agent on a colored substrate such as a dyed fabric, preferably, the nanoporous cerium oxide nanoparticle macro-structure is present at a level of 0.1% by weight to 5.0% by weight in combination with the polymeric binder, preferably in a liquid (e.g. water) medium. More preferably, the level of nanoporous cerium oxide nanoparticle macro-structure may be in the range of 1.0% by weight to 4.0% by weight, or 1.5% by weight to 3.0% by weight. Reference to a polymeric binder is reference to a polymeric resin that binds (e.g. adheres) to a given substrate, such as a fabric surface. Suitable binders herein include poly(vinyl acetate), styrene-acrylic resins, acrylic resins, alkyd resins, epoxy, polyester, and polyurethanes to mention a few. Such resins may be configured to be present in an organic solvent and/or a water medium. In addition, such finishing agent formulations may or may not require and are preferably such that they do not contain any surface-active agents such as surfactants and/or dispersants. When the nanoporous cerium oxide nanoparticle macro-structures (NCeONP) are employed herein in a printing paste or ink formulation containing a pigment and/or dye, the cerium oxide nanoparticle macro-structures are preferably again present at a level of 0.1% by weight to 5.0% by weight along with polymeric binder at a level of 5.0% by weight to 20.0% by weight, optionally some thickener at a level of up to 2.0% by weight, pigment and/or dye at a preferred level of 0.1% by weight to 5.0% by weight, and the balance is liquid (e.g. water). More preferably, the nanoporous cerium oxide nanoparticle macro-structure is present in such a liquid formulation at a level of 1.0% by weight to 3.0% by weight. The preferred polymeric binder for such printing paste or ink formulation is as noted above, selected from poly(vinyl acetate), acrylic resins, styrene-acrylate copolymer and/or polyurethanes. In addition, similar to the use of the nanoporous cerium oxide nanoparticles as a finishing agent noted above, the printing paste or ink formulations noted herein preferably do not require the use of a surfactant and/or dispersant. Such printing pastes or ink formulation are as noted, preferably liquid.

It is also contemplated herein that the nanoporous cerium oxide nanoparticle macro-structure can be employed in a clear coat formulation (i.e. a coating formulation that does not contain pigment or dye). A clear coat formulation typically includes a polyurethane and/or an acrylic type resin, poly(vinyl acetate), styrene-acrylic resins, acrylic resins, alkyd resins, epoxy, polyester, and polyurethanes to mention a few in a liquid media, such as a water based or organic based formulation. The level of nanoporous cerium oxide nanoparticle macrostructure that is present in the clear coat formulation may preferably fall in the range of 0.1% by weight to 5.0% by weight.

Working Examples

Synthesis of Nanoporous Cerium Oxide Nanoparticle Macro-Structure

Reference is made to Table 1 below. Cerium oxide nanoparticles were employed as starting materials having an average particle size of 20-30 nm with a porosity of the particles close to zero. Two different samples of non-porous spherical cerium oxide nanoparticles (CeONP-1 and CeONP-2) were subjected to heating at different temperatures in order to form the nanoporous cerium oxide nanoparticle macro-structure. As can be seen from Table 1, both nanoparticles to start with did not have any significant porosity. In addition, bimodal nanoporous nanoparticle macro-structure (pore diameter data from BET and Hg Intrusion porosity data in Table 1) were confirmed.

It is noted that porosity measurements from BET using nitrogen generally detect the presence of relatively smaller pore volume and width (largest linear dimension) whereas using MIP measurements detects relatively larger pore volumes and width (largest linear dimension). Reference is made to *Multiphase Flow and Fluidization*, D. Gidaspoc (Elsevier 1994), for a discussion of these techniques. By using porosity measures of the nanoporous cerium oxide nanoparticle macro-structures using both BET and MIP measurements, as can be observed, the presence of a binary size distribution with respect to both their macro-structure diameter 16 and pore diameter 15 (see again FIG. 2) has been observed.

In a preferred synthesis procedure, the nanoparticles were taken in a crucible and heated in an oven at respective temperatures to form the nanoporous cerium oxide nanoparticle macro-structure. The macro-structure after formation was analyzed for the macro-structure pore size using two types of porosity measurements—BET $N_2$ intrusion and Hg Intrusion methods to identify the macro-structure pore diameter range from 10-1100 nm. CeONP-1 was degassed with $N_2$ and heated at 100° C. for 2.0 hours, and one observes the nanoporous cerium oxide nanoparticle macro-structure having: (1) macro-structure diameter in the range of 100 nm to 200 nm with macro-structure pore diameters of 10 nm to 15 nm (BET/$N_2$ measurement indicating 11.056 nm); and (2) nanoporous cerium oxide nanoparticle macro-structure having a macro-structure diameter of 25,000 nm and macro-structure pore diameter of 900 nm to 1100 nm (MIP method indicating 986 nm).

TABLE 1

| Material | Description | Pore Volume (cc/g) | Macro-Structure Pore Diameter (nm) | Measurement Method |
|---|---|---|---|---|
| Cerium Oxide Nanoparticles (CeONP-1) | Particle Size 20 nm to 30 nm | 0 | 0 | BET/$N_2$ |
| Nanoporous Cerium Oxide Nanparticle Macro-Structure (NCeONP-1) | CeONP-1, degassed with $N_2$, heated at 100° C. for 2.0 hours | 0.068 | 11.056 | BET/$N_2$ |
| Nanoporous Cerium Oxide Nanparticle Macro-Structure (NCeONP-1) | CeONP-1, degassed with $N_2$, heated at 100° C. for 2.0 hours | 0.37 | 986 | Mercury Intrusion Porosimetry (MIP) |
| Nanoporous Cerium Oxide Nanparticle Macro-Structure (NCeONP-1) | CeONP-1, degassed with $N_2$, heated at 500° C. for 2.0 hours. | 0.074 | 10.682 | BET/$N_2$ |
| Nanoporous Cerium Oxide Nanparticle Macro-Structure (NCeONP-1) | CeONP-1, degassed with $N_2$, heated at 900° C. for 2.0 hours. | 0.012 | 14.559 | BET/$N_2$ |
| Cerium Oxide Nanoparticles (CeONP-2) | Particle Size 20 nm to 30 nm | 0.009 | 1.144 | BET/$N_2$ |
| Nanoporous Cerium Oxide Nanparticle Macro-Structure (NCeONP-2) | CeONP-2, degassed with $N_2$, heated at 100° C. for 2.0 hours | 0.009 | 1.144 | BET/$N_2$ |
| Nanoporous Cerium Oxide Nanparticle Macro-Structure (NCeONP-2) | CeONP-2 placed in boiling water for 1.0 hour, dried and analyzed. | 0.025 | 21.99 | BET/$N_2$ |

Nanoporous Cerium Oxide Nanoparticles as a Finishing Agent and Use in Pigments/Dyes Cotton fabric was taken as grey cloth and after washing to remove dirt and grease, was taken for dyeing. Reactive dyes were used to dye the fabric in 2 different colors—Red and Navy Blue. The dyed fabric was washed to remove excess dye and was ready for finishing. For finishing two different types of aqueous solution were prepared:
1. Addition of 10 grams of emulsion polymer of poly (vinyl acetate) in 1 litre of soft water at ambient temperature (finishing agent control without NCeONP).
2. Addition of 10 grams of emulsion polymer of PVA in 1 liter of soft water. To this was added 15 grams of the nanoporous cerium oxide nanoparticle macro-structure and stirred vigorously. All operations were at ambient temperature. The nanoporous cerium oxide nanoparticle (NCeONP) macro-structures utilized herein were characterized as having: (1) macro-structure diameter of about 150 nm with macrostructure pore size of about 10 nm; and (2) macro-structure diameter in the range of about 25,000 nm with a macro-structure pore size of about 996 nm.

The fabric samples were then dipped in the above reference liquid finishing media with different loadings of the nanoporous cerium oxide nanoparticle macrostructures and allowed to pick up the PVA and the nanoporous cerium oxide nanoparticle (NCeONP) macrostructures. All pieces of fabric were passed through mangles to ensure equal pick up as the extra solution was squeezed out by the rollers. The wet fabric samples were then heat treated at 160° C. for 3 minutes each. The samples were then ready for testing of light fastness before and after exposure to 100 hrs of UV light. See Table 2.

TABLE 2

Color Fastness Test on Dyed Fabrics After 100 Hours of UV Exposure

| Parameter | Navy Blue Dyed Fabric finished with 1.5% (wt) NCeONP Macro-Structure | | Red Dyed Fabric finished with 1.5% (wt.) NCeONP Macro-Structures | | Red Dyed Fabric finished with 3.5% (wt.) NCeONP Macro-Structures | |
|---|---|---|---|---|---|---|
| | PVA Only | PVA + NCeONP Macro-Structure | PVA Only | PVA + NCeONP Macro-Structure | PVA Only | PVA + NCeONP Macro-Structure |
| Delta E (dE) | 2.89 | 3.09 | 5.50 | 2.78 | 5.47 | 3.28 |
| K/S (Color Strength) | 13.603 | 12.177 | 11.092 | 12.023 | 5.417 | 3.521 |
| Color Strength After Lightfastness Test | 80.84% | 79.22% | 65.71% | 83.13% | 69.39% | 88.03% |
| Blue Wool Index | 3 | 3 | 3 | 3-4 | 4 | 4-5 |

In the above Table 2, Delta E (dE) is the measure of change in visual perception of two given colors. It is based on the idea that a dE of 1.0 is the smallest color difference of the average human eye. The generally guidelines employed are as follows: dE<1.0 (not perceptible to the average human eye); dE=1-2 (perceptible via close observation); dE=2-10 (perceptible at a glance); dE=11-49 (colors are more similar than opposite); dE 100 (colors are exact opposite). The color strength K/S is evaluated by an absorbance spectrophotometer and is given by the Kubelka-Munk (K/S) value. K/S values are obtained from the Kubelk-Munk equation as follows: $K/S=(1-R)^2/2R$ where K is a constant, S is a constant about the light scattering of the dyed fabric and R is reflectance of the dyed fabric, expressed in fractional form. K/S is dependent on the light absorption of the dyed fabric at maximum absorption wavelength and is associated with the reflectance of the dyed fabric. Higher values represent relatively darker and relatively more saturated colors. The Blue Wool Index measures and calibrates the permanence of the coloring. In this evaluation, the amount of fading of the sample is assessed by comparison to the samples without the NCeONP. A rating between 0 and 8 is awarded, where 0 denotes relatively poor color fastness while a rating of 8 is deemed not to have altered from the original and thus credited as being lightfast and permanent. Color Strength After Lightfastness Test is reference to a measurement of color strength after exposure to UV light, and reference is made to *Physical Testing of Textiles, 1st Edition*, B. P. Saville (Elsevier 1999).

As can be observed from Table 2, the data for Navy Blue Dyed Fabric in both cases of PVA finishing and with PVA+1.5% (wt.) NCeONP macro-structure, are relatively similar. This may be said to be within the tolerance limits. However, from the data of the Red Dyed fabric, both for dosage of 1.5% (wt.) and 3.5% (wt.) NCeONP macro-structure, identify that dE is significantly lower for the fabrics with NCeONP macro-structure, confirming the effect of the NCeONP macro-structure on maintaining color after the indicated UV exposure. Color Strength (K/S) at 1.5% loading of the NCeONP macro-structure is also clearly more for the Red Dyed fabric with the NCeONP macro-structure. In case of Blue Wool Index with Red Dyed Fabric, the values indicate an increasing trend, the use of the NCeONP macro-structures confirm relatively less fading and better color fastness and permanency. It is to be noted that the effect of NCeONP macrostructures could be further improved by ensuring better dispersion of them in water or dyeing or finishing media. Since we observed settling of some of the NCeONP at the bottom of the dye vats, it can be concluded that the effect we are observing in improved color strength and color fastness can occur throughout the concentration range of 0.1% by weight to 5.0% by weight.

As noted above, in another technique, the nanoporous cerium oxide nanoparticle macro-structures herein may be mixed with pigment prior to application on a given substrate, such as a mixture of the cerium oxide nanoparticle macro-structures with a pigment and other ingredients (e.g., polymeric binder and water) and then employed as a printing paste or ink in various printing applications. By way of example, a grey fabric was not dyed but bleached to give white fabric. A printing paste was made by employing a styrene acrylate binder, thickener, and pigment/dye (red, green, black or blue). In a half portion of the paste was added 1.5% by weight nanoporous cerium oxide nanoparticle macrostructure noted above having: (1) macro-structure diameter of about 150 nm with macrostructure pore size of about 10 nm; and (2) macro-structure diameter in the range of about 25,000 nm with a pore size of about 996 nm. The composition was therefore as follows: binder—10% (wt.), thickener at 2% (wt.), pigment at 4% (wt.), porous cerium oxide nanoparticle macrostructure at 1.5% to 5% (wt.), with water as the balance of the formulation.

A heat treatment followed at 150° C. for 5 minutes. The bleached fabric was then stretched and pinned on to the wooden table. A printing screen with selected design was employed followed by pouring of the above referenced printing paste onto the screen. The paste was pulled from one end to the other, with the screen allowing the paste to pass through and deposit on the fabric. This was repeated with printing paste having the nanoporous cerium oxide nanoparticle macrostructure and with different colours (blue, black, green and red). The printed fabric was again heat treated at 150° C. for 5 min each. The printed fabrics were now ready for testing of color value or color strength.

The test results for the above referenced printed fabrics are summarized in Table-3

TABLE 3

Color Strength Evaluation Of Printing Inks And Printed Fabrics

| Parameter | Blue Printed Fabric with NCeONP Macro-Structure Compared To Without | Red Printed Fabric with NCeONP Macro-Structure Compared to Without |
|---|---|---|
| Loading of NCeONP Macro-Structure | 1.5% (wt.) | 1.5% (wt.) |
| DL | −0.08 | −1.09 |
| dE | 0.97 | 1.49 |
| Strength % | 101.84% | 116.27% |

In Table 3, DL is reference to the difference in lightness values or color brightness. A negative value of DL means it is darker than the reference or control (no NCeONP macro-structures). The Strength % is reference to color value according to AATCC Evaluation Procedure 6 "Instrumental Color Measurement", American Association of Textile Chemists and Colorists (2016).

It is observed that in both cases of red and blue colour printing, the DL value of fabrics with NCeONP macro-structures is negative, showing that the shade is relatively darker than the fabric without the NCeONP macro-structures. This is further supported by the strength of colour that is more than 100% in both cases. While blue shows a marginal improvement at 101.84%, red shows a significant improvement (116.27%) upon use of the NCeONP macro-structures. It is to be noted that the effect of NCeONP macrostructures could be further improved by ensuring better dispersion in the ink medium. Since there was settling of some of the NCeONP at the bottom of the dye vats, it is contemplated that the effect observed in improved color strength and color fastness can occur throughout the concentration range of 0.1% by weight to 5.0% by weight.

The red and blue printed fabrics noted above with and without the NCeONP macrostructure were again subjected to UV exposure and their fading was studied using the Blue Wool index scale where the lightfastness is rated between 1-8, with 1 being very poor and 8 being excellent lightfastness. After 100 hours of exposure, there was hardly any observed change in color and the Blue Wool index scale showed that they had a lightfastness of more than 6.0. As noted, this is very good lightfastness and relatively long life on exposure to sunlight.

The printing experiments with red and blue were then compared with green and black pigment at two different concentrations of the NCeONP macrostructures, namely 15 grams per liter "gpl" (1.5% by wt.) and 30 gpl (3.0% by wt.), using a dye concentration of 4.0% by wt. The results are provided in Table 4 below.

TABLE 4

Color Strength Evaluation Of Printing Inks And Printed Fabrics

| Sl. No. | NCeONP Macro-Structure | L value | dE Compared to one without the NCeOMP Macro-Structures | Color Strength |
|---|---|---|---|---|
| | Red Printed Fabric with Dye-Coractive Red M5B | | | |
| 1 | Blank | 43.62 | | 100% |
| 2 | 15 gpl | 42.86 | 1.01 | 108.38% |
| 3 | 30 gpl | 41.92 | 2.70 | 120.15% |
| | Blue Printed Fabric-Coracion N Blue HER Dye | | | |
| 1 | Blank | 23.89 | | 100% |
| 2 | 15 gpl | 23.09 | 0.97 | 100.23% |
| 3 | 30 gpl | 23.82 | 0.21 | 100.20% |
| | Green Printed Fabric-Dye Used is Coracian Green HE4B | | | |
| 1 | Blank | 28.78 | | 100% |
| 2 | 15 gpl | 27.93 | 1.64 | 106.21% |
| 3 | 30 gpl | 29.19 | 1.20 | 96.56% |
| | Black Printed Fabric-Dye Used Corafix Black GDNN | | | |
| 1 | Blank | 18.20 | | 100% |
| 2 | 15 gpl | 18.77 | 0.88 | 94.35% |
| 3 | 30 gpl | 17.69 | 0.62 | 104.57% |

The red, blue, green and black dyed fabrics with and without the NCeONP macrostructure were subjected to 100 hours of UV exposure and their fading was studied using color strength and the Blue Wool index scale. The comparative data is provided in Table 5.

TABLE 5

Color Strength, Color Fastness & Blue Wool Index Values Of Different Colour-Dyed Finished Fabrics With NCeONP

| | | DE | K/S | % Colour Strength After Lightfastness Test | Blue Wool Index |
|---|---|---|---|---|---|
| Navy Blue Dyed Fabric | PVA Only | 2.36 | 16.738 | 87.29% | 4 |
| | PVA + 1.5% (wt) NCeONP | 1.46 | 12.177 | 89.22% | 4 |
| | PVA + 3.0% (wt) NCeONP | 1.59 | 6.676 | 105.55% | 4 |
| | PVA + 4.5% (wt) NCeONP | 3.00 | 5.397 | 86.87% | 3-4 |
| Red Dyed Fabric | PVA Only | 2.89 | 13.603 | 80.84% | 3-4 |
| | PVA + 1.5% (wt) NCeONP | 2.78 | 12.023 | 83.13% | 3-4 |
| | PVA + 3.0% (wt) NCeONP | 2.31 | 9.069 | 87.64% | 4-5 |
| | PVA + 4.5% (wt) NCeONP | 3.28 | 3.521 | 88.03% | 4-5 |
| Green Dyed Fabric | PVA Only | 5.78 | 10.789 | 64.14 | 2-3 |
| | PVA + 1.5% (wt) NCeONP | 4.69 | 6.28 | 76.40% | 2-3 |
| | PVA + 3.0% (wt) NCeONP | 7.48 | 4.375 | 57.11% | 2 |
| | PVA + 4.5% (wt) NCeONP | 7.00 | 4.112 | 60.12% | 2 |
| Black Dyed Fabric | PVA Only | 0.57 | 19.632 | 95.59% | 4-5 |
| | PVA + 1.5% (wt) NCeONP | 1.94 | 12.461 | 85.55% | 4-5 |
| | PVA + 3.0% (wt) NCeONP | 0.92 | 8.006 | 96.15% | 4-5 |
| | PVA + 4.5% (wt) NCeONP | 5.41 | 7.337 | 64.55 | 2-3 |

The following is observed from Table 5:

1. At a loading of 3%, blue dyed fabric showed about a 20% increase in colour strength with blue wool index remaining constant at 4 with and without NCeONP.
2. At a loading of 4.5% red dyed fabric showed about a 10% increase in colour strength with an improvement in Blue Wool Index by a point
3. At a loading of 1.5% green dyed fabric showed a 18% increase in colour strength with no change in the blue wool index.
4. At a loading of 3%, while there was no increase in colour strength or change in Blue Wool Index of black dyed fabric, there was also no fading observed.

While there were certain situations where the data indicated a drop in, e.g., colour strength versus the control after 100 hours of UV exposure (see e.g., navy blue dyed fabric at 4.5% (wt.) NCeONP), it is believed that such results can be attributed to the relative difficulty of evenly dispersing (as seen by quick settling of NCeONP particles at the bottom) of the NCeONP in the dye and then evenly onto the fabric for color testing due to such settling. It is therefore worth emphasizing that preferably, the NCeONP should be well-dispersed which is contemplated to ensure the effect of the NCeONP in maintaining color strength. Therefore, it is contemplated that both color strength and color fastness will be either similar to the case of printing inks or even better. Additionally, since settling of some of the NCeONP at the bottom of the dye vats was observed, it can be concluded that the effect observed herein in improved color strength and color fastness can occur throughout the concentration range of 0.1% by weight to 5.0% by weight. In another embodiment, the bimodal NCeONP macrostructures were compared with monomodal NCeONP having macro-structure diameter in the range of 20 nm to 200 nm with macro-structure pore diameters of 5 nm to 15 nm for their influence as printing inks on a fabric and the % colour strength after exposure to 100 hrs of UV light. See Table 6. The bimodal NCeOP results are provided within brackets for comparison.

TABLE 6

Comparison Of Bimodal NCeONP Macrostructures To Monomodal NCeONP Macrostructures In Printing

| | | DE | K/S | % Colour Strength After Lightfastness Test |
|---|---|---|---|---|
| Navy Blue Printing | PRINTING BINDER + 1.5% (wt) mono modal NCeONP | 0.70 (2.98) | 20.728 (15.343) | 99.19% (83.87%) |
| | PRINTING BINDER + 3.0% (wt) monomodal NCeONP | 1.02 (3.91) | 22.116 (11.255) | 108.99% (79.54%) |
| Red Printing | PRINTING BINDER + 1.5% (wt) mono modal NCeONP | 0.12 (2.18) | 18.996 (14.761) | 99.02% (84.29%) |
| | PRINTING BINDER + 3.0% (wt) mono modal NCeONP | 0.66 (3.71) | 19.817 (13.617) | 104.72% (79.89%) |
| Green Printing | PRINTING BINDER + 1.5% (wt) mono modal NCeONP | 2.28 (6.08) | 22.130 (9.501) | 115.30% (59.93%) |
| | PRINTING BINDER + 3.0% (wt) mono model NCeONP | 3.01 (6.51) | 23.193 (7.815) | 122.35% (57.11%) |
| Black Printing | PRINTING BINDER + 1.5% (wt) mono model NCeONP | 0.17 (1.14) | 24.617 (18.906) | 98.97% (89.64%) |
| | PRINTING BINDER + 3.0% (wt) NCeONP | 0.93 (3.64) | 25.693 (16.053) | 107.76% (73.66%) |

The comparative data in Table 6 clearly indicates that the efficacy of mono modal NCeOP macrostructures is better than the biomodal NCeONP in the application as a printing ink on fabrics. Additionally, since settling of some of the NCeONP at the bottom of the dye vats was observed, it can be concluded that the effect observed herein in improved color strength and color fastness can occur throughout the concentration range of 0.1% by weight to 5.0% by weight.

As noted above, pigments that may be improved in performance with respect to exposure to UV light include natural pigments, and in particular, the carotenoids. The following working examples are therefore noted, where the carotenoid pigment from carrot pulp was evaluated on the surfaces of cloth and wood.

Figure 5:
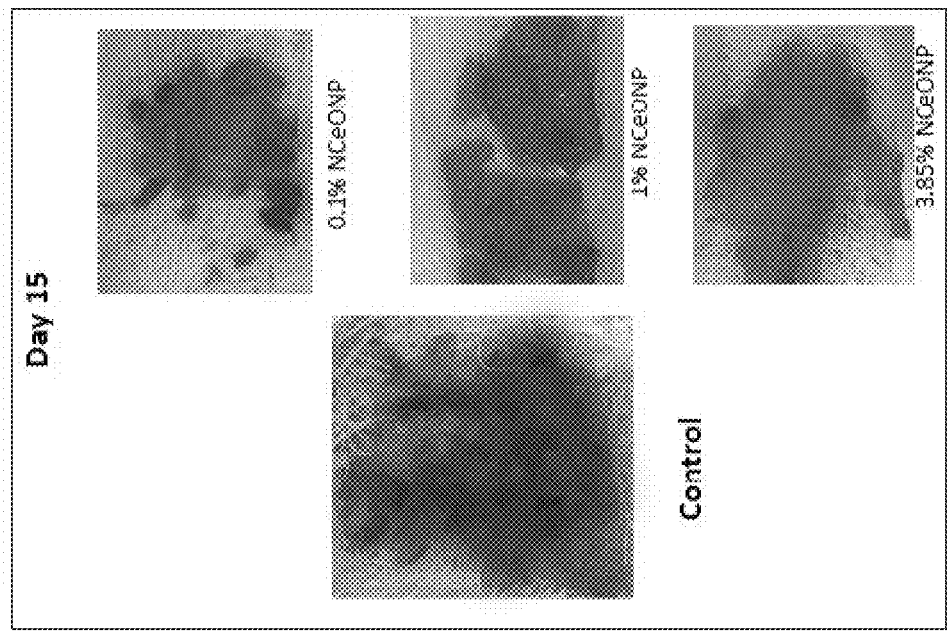
FIG. 5 illustrates testing on the effect of nanoporous cerium oxide nanoparticle macro-structure on cheesecloth coated with freshly prepared carrot pulp versus a control (no cerium oxide nanoparticle macro-structure) at the indicated loadings.
Figure 5:
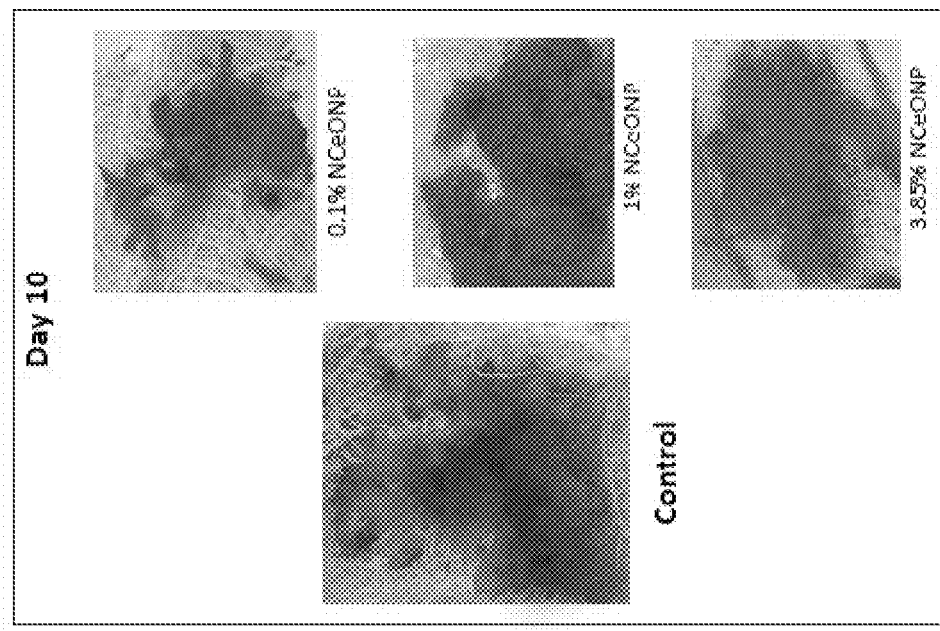
Figure 5:
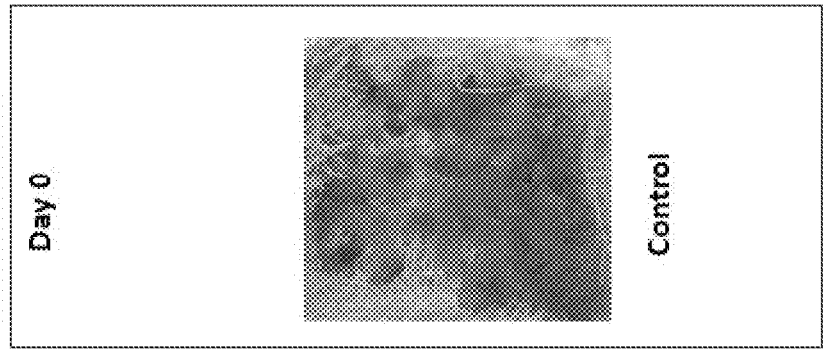

1. A commercial simple of cheesecloth was cut into two pieces. The control piece was soaked in deionized water and the test sample was soaked in a water dispersion containing 0.1% (wt.), 1% (wt.) and 3.85% (wt.) of the above referenced nanoporous cerium oxide particle bimodal macro-structures (NCeONP) having: (1) macro-structure diameter of about 150 nm with macrostructure pore size of about 10 nm; and (2) macro-structure diameter in the range of about 25,000 nm with a pore size of about 996 nm. Both pieces of the cheesecloth were then coated with freshly prepared carrot pulp and were observed for reduction in brightness as well as for formation of mold. As can be seen from FIG. 5, after 10 days the control was more significantly discoloured. By comparison, loadings of 0.1% (wt.) NCeONP macro-structures began to reduce the amount of discoloration, with best performance indicated at 3.85% (wt.), after both 10 days or 15 days of exposure. After 15 days at a loading of 3.85% (wt.) of the NCeONP macro-structures, the overall brightness was unchanged and there was no mold observed on the carrot pulp.

Figure 6:
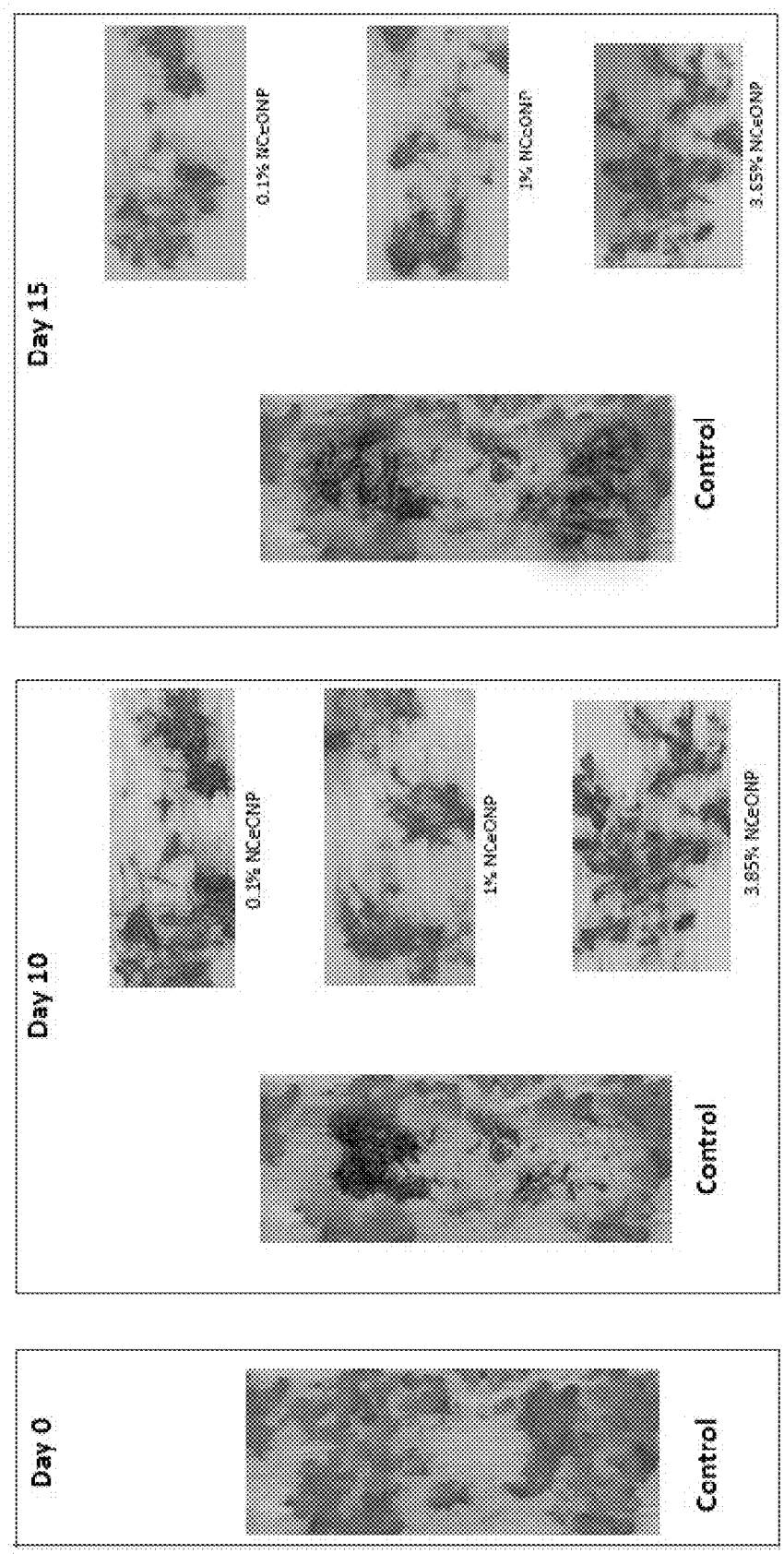
FIG. 6 illustrates testing on the effect of nanoporous cerium oxide nanoparticle macro-structure on wood panels coated with freshly prepared carrot pulp (source of natural carotenoid pigment) versus a control (no cerium oxide nanoparticle macro-structure) at the indicated loadings.

2. Samples of wood panels were selected. The control sample was soaked in deionized water and the test sample was soaked in a water dispersion containing 0.1% (wt.), 1% (wt) and 3.85% (wt.) of the NCeONP macro-structures having the bimodal distribution of macroparticle size and pore size noted above. The control and test pieces were then coated with freshly prepared carrot pulp. As seen in FIG. 6, the test samples generally indicated that the brightness was unchanged without any mold on the carrot pulp, for those test samples containing the NCeONP macro-structures.

Figure 7:
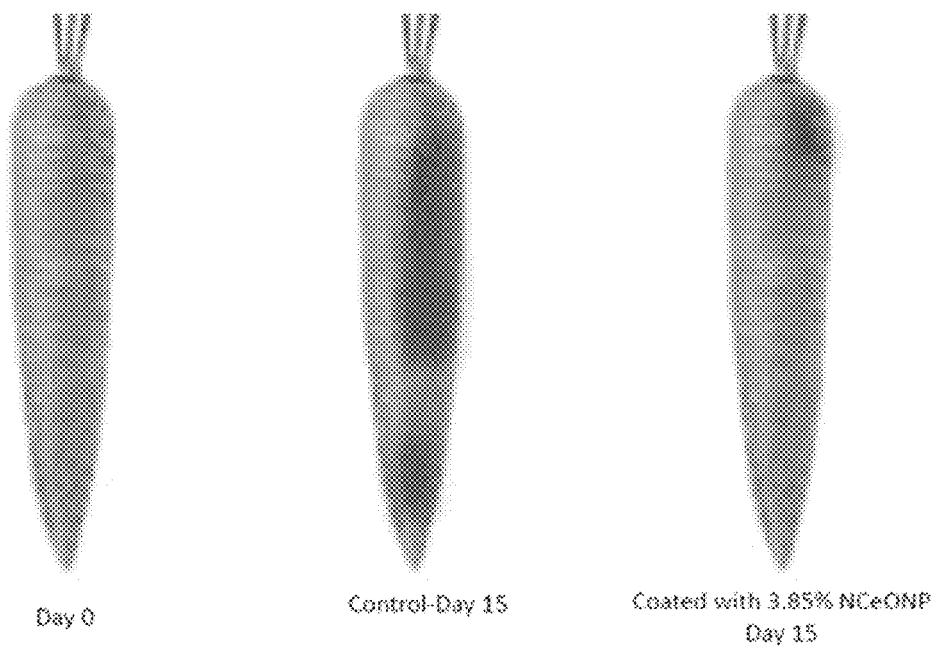
FIG. 7 illustrates testing on the effect of the nanoporous cerium oxide nanoparticle macro-structures applied on the surface of carrots.

3. Freshly purchased carrots were placed on a cloth surface and coated with water dispersion containing 3.85% (wt.) of the NCeONP macro-structures having the bimodal distribution noted above. As illustrated in FIG. 7, versus a control the sample coated with the NCeONP macro-structures minimized the formation of black spot disease after 15 days.

Figure 8:
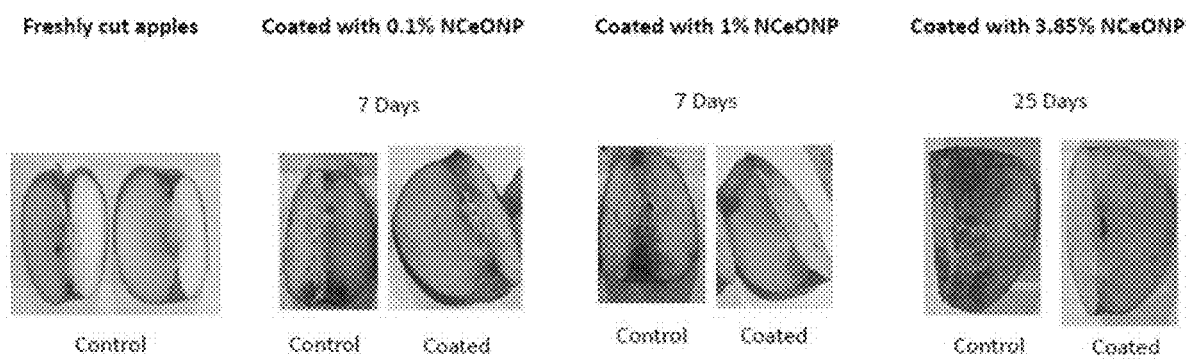
FIG. 8 illustrates testing on the effect of nanoporous cerium oxide nanoparticle macro-structure on the surface of apples in preventing discoloration versus a control (no cerium oxide nanoparticle macro-structure) at the indicated loadings.

4. A fresh batch of apples were cut into two halves and divided into two categories. The first set, the control, was sprayed with deionized water. The second set was sprayed with a water dispersion containing 3.85% (wt) of the NCeONP macro-structures having the bimodal distribution noted above. The first set (control) and second set (test sample) were stored in a plastic container and observed over a period of 25 days for discolouration and mold. As seen in FIG. 8, the apples coated with the water dispersion containing 3.85% (wt.) of the NCeONP macro-structures herein having the bimodal distribution noted above retained color and there was no mold after 25 days.

From the above, the cerium oxide nanoparticle macro-structures herein, comprising a plurality of cerium oxide nanoparticles having a diameter in the range of 10 nm to 100 nm present as a macro-structure having macro-structure diameter in the range of 50 nm to 30,000 nm and macro-structure pore diameter in the range of 10 nm to 1100 nm, have been demonstrated to prolong and maintain the stability of natural pigments and/or dyes (such as the carotenoids present in carrots or the natural pigments in apples). Accordingly, the natural pigments and dyes that may now be improved in their stability over time have been shown to include pigments and/or dyes found in nature. Reference to color stability may be understood as improvement in the value of DL, dE, Strength % and/or Blue Wool index performance, as noted herein.

What is claimed is:

1. Nanoporous cerium oxide nanoparticle macro-structure comprising:
    a plurality of cerium oxide nanoparticles present as a macro-structure having a binary size distribution of:
    (1) a macro-structure diameter in the range of 10 nm to 300 nm and a macro-structure pore diameter in the range of 5 nm to 30 nm; and
    (2) a macro-structure diameter in the range of 5,000 nm to 30,000 nm and a macro-structure pore diameter in the range of 900 nm to 1100 nm.

2. The nanoporous cerium oxide nanoparticle macro-structure of claim 1 wherein said macro-structure having a diameter in the range of 10 nm to 300 nm has a macro-structure pore diameter in the range of 10 m to 20 nm.

3. A formulation comprising: a plurality of cerium oxide nanoparticles having a diameter in the range of 10 nm to 100 nm present as a macro-structure in combination with a pigment or dye, wherein said macro-structure has macro-structure diameter in the range of 50 nm to 30,000 nm and macro-structure pore diameter in the range of 10 nm to 1100 nm.

4. The formulation of claim 3 wherein said formulation is a liquid formulation and said cerium oxide macro-structure is present at a level of 0.1% by weight to 5.0% by weight.

5. The formulation of claim 3 wherein said formulation is a printing ink.

6. The formulation of claim 3 wherein said pigment or dye comprises an organic composition.

7. The formulation of claim 3 wherein said pigment or dye comprises an inorganic composition.

8. The formulation of claim 3 wherein said pigment or dye includes natural pigments or natural dyes.

9. The formulation of claim 3 wherein said formulation is a dyeing formulation for dyeing a textile fabric.

10. A method for improving the color stability of a pigment or dye on or within a given substrate, comprising:
    supplying nanoporous cerium oxide nanoparticle macro-structure (NCeONP) comprising a plurality of cerium oxide nanoparticles having a diameter in the range of 10 nm to 100 nm present as a macro-structure having macro-structure diameter in the range of 50 nm to 30,000 nm and macro-structure pore diameter in the range of 10 nm to 1100 nm; and
    applying said nanoporous cerium oxide nanoparticle macro-structure to a surface of said substrate.

11. The method of claim 10 wherein said pigment or dye comprises a natural pigment and/or a natural dye.

* * * * *